(12) United States Patent
Chen et al.

(10) Patent No.: US 9,152,025 B2
(45) Date of Patent: Oct. 6, 2015

(54) PROJECTOR WITH HEAT SINKS AND SINGLE FAN MODULE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chien-Fu Chen, New Taipei (TW); Zhi-Hao Wu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 201 days.

(21) Appl. No.: 13/910,127

(22) Filed: Jun. 5, 2013

(65) Prior Publication Data

US 2014/0204345 A1 Jul. 24, 2014

(30) Foreign Application Priority Data

Jan. 23, 2013 (CN) .......................... 2013 1 0024588

(51) Int. Cl.
| | |
|---|---|
| *G03B 21/16* | (2006.01) |
| *G03B 21/26* | (2006.01) |
| *G03B 21/28* | (2006.01) |
| *G02B 6/42* | (2006.01) |
| *G03B 21/00* | (2006.01) |

(52) U.S. Cl.
CPC .............. *G03B 21/16* (2013.01); *G02B 6/4269* (2013.01); *G03B 21/008* (2013.01); *G03B 21/26* (2013.01); *G03B 21/28* (2013.01)

(58) Field of Classification Search
CPC ........ G03B 21/16; G03B 21/26; G03B 21/28; G02B 6/4269
USPC ............... 353/31, 57, 60, 61, 119; 165/59, 66
See application file for complete search history.

(56) References Cited

U.S. PATENT DOCUMENTS

| | | |
|---|---|---|
| 2005/0264766 A1 | 12/2005 | Morimoto et al. |
| 2010/0045941 A1 * | 2/2010 | Chen .............................. 353/61 |
| 2011/0019161 A1 * | 1/2011 | Chen et al. ...................... 353/61 |

FOREIGN PATENT DOCUMENTS

| | | |
|---|---|---|
| CN | 1704839 A | 12/2005 |
| CN | 101726979 A | 6/2010 |
| CN | 103324013 A | 9/2013 |

* cited by examiner

*Primary Examiner* — William C Dowling
*Assistant Examiner* — Magda Cruz
(74) *Attorney, Agent, or Firm* — Novak Druce Connolly Bove + Quigg LLP

(57) ABSTRACT

An image projector in a case, having a light engine, a circuit board, a heat sink assembly, and a fan assembly, has one or more heat sinks and heat pipes shaped to gather heat from all heat-generating components within the projector and a single air passage to receive the heated air combined from all components, allowing the employment of a single fan module in sucking cool air from the exterior and exhausting heated air through the single air passage.

8 Claims, 3 Drawing Sheets

PROJECTOR WITH HEAT SINKS AND SINGLE FAN MODULE

BACKGROUND

1. Technical Field

The present disclosure relates to projectors and, particularly, to a projector capable of effectively dissipating heat.

2. Description of Related Art

Projectors need more than one fan for dissipating heat from more than one heat source, such as a light source, a spatial light modulator, and a circuit board together, the additional fans increase the size and the cost of the projector and generate more noise.

Therefore, it is desirable to provide a projector, which can overcome the limitations described.

DETAILED DESCRIPTION

Embodiments of the disclosure will be described with reference to the drawings.

Figure 1:
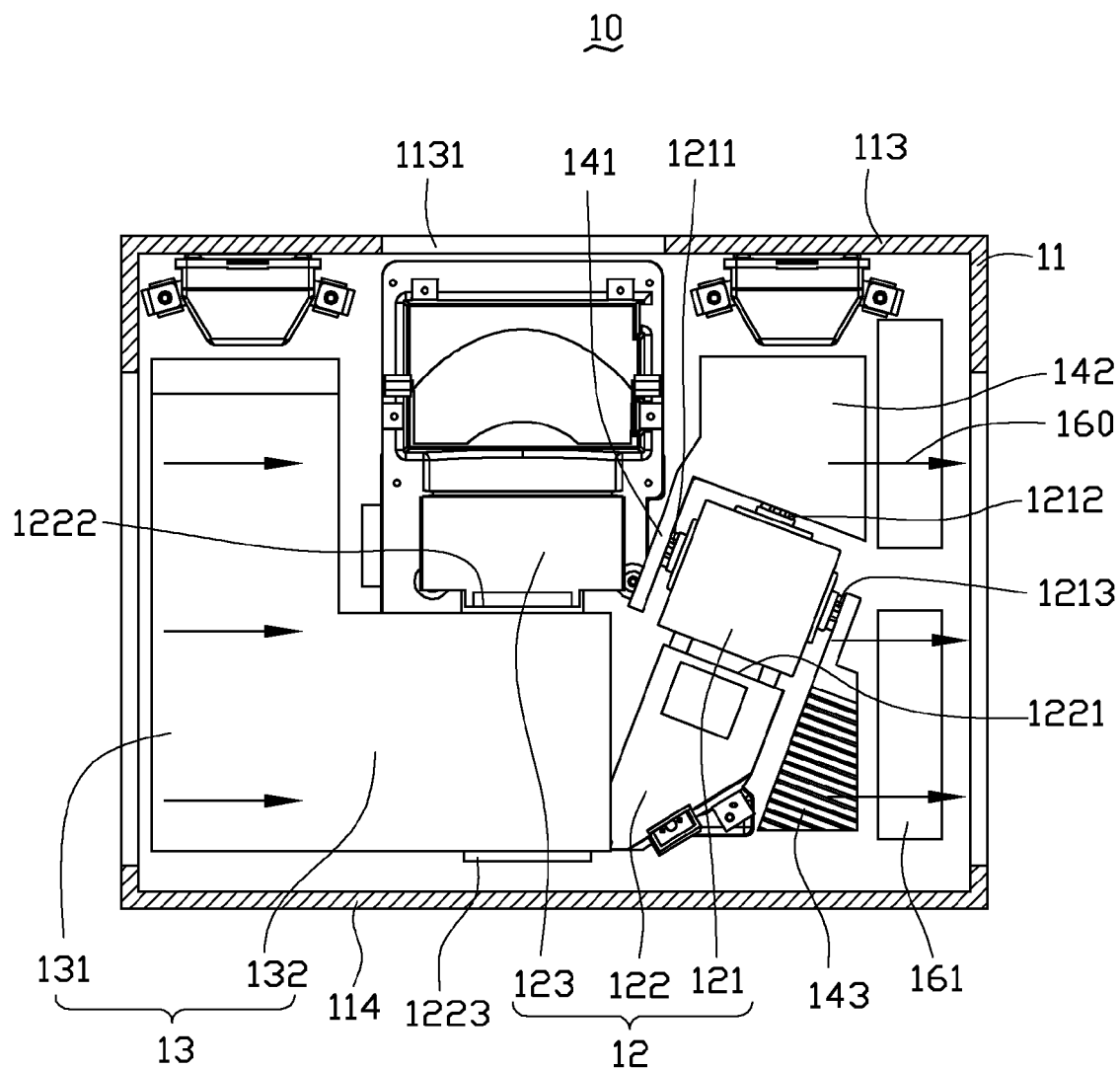
FIG. 1 is a schematic view of a projector in accordance with an exemplary embodiment.
Figure 2:
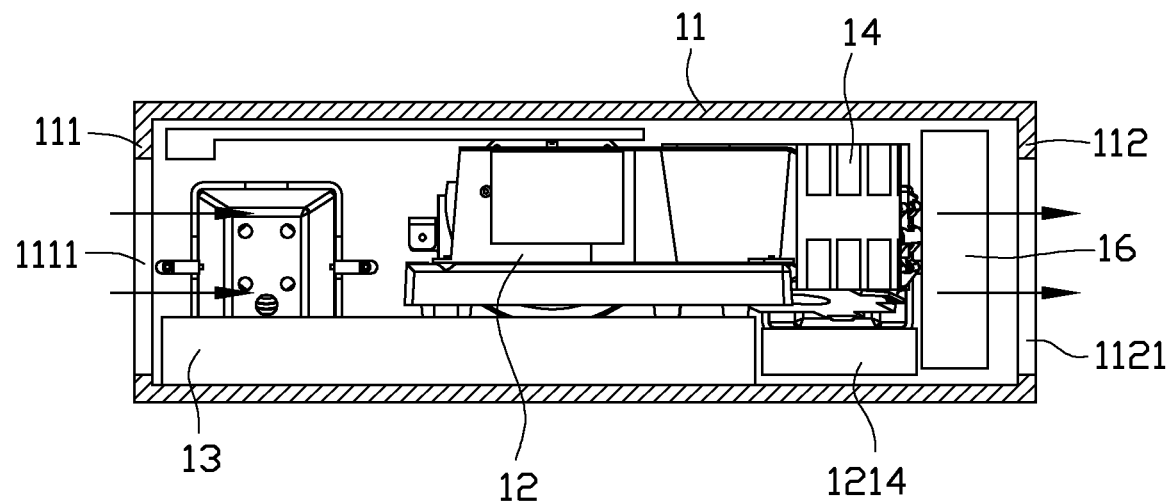
FIG. 2 is a cross-sectional view of the projector of FIG. 1.
Figure 3:
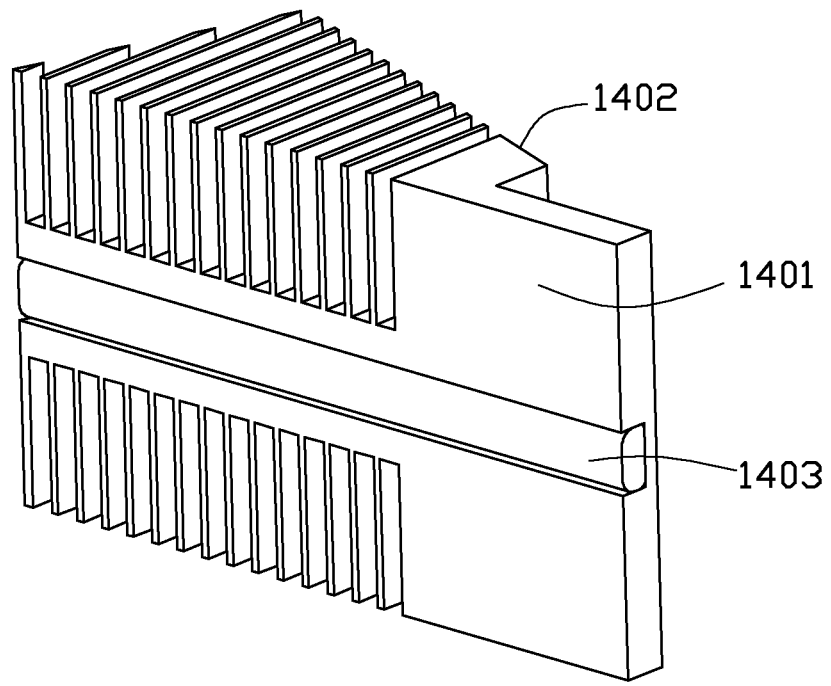
FIG. 3 is an isometric view of a heat sink of the projector of FIG. 1.

Referring to FIGS. 1-3, a projector 10, according to an exemplary embodiment, includes a case 11, a light engine 12, a circuit board 13, a heat sink assembly 14, and a fan assembly 16. In this embodiment, the projector 10 is a digital light processor (DLP) projector.

The case 11 is a closed cuboid and includes a left sidewall 111, a right sidewall 112, a front sidewall 113, and a rear sidewall 114. The left sidewall 111 is opposite to the right sidewall 112, and the front sidewall 113 is opposite to the rear sidewall 114. The left sidewall 111 defines an air inlet 1111, and the right sidewall 112 defines an air outlet 1121. The air inlet 1111 is aligned with the air outlet 1121. The front sidewall 113 defines a through hole 1131, generally adjacent to a middle of the front sidewall 113.

The light engine 12 is received in the case 11, generally adjacent to a middle of the case 11. The light engine 12 includes a light source module 121, an optical module 122, and a lens 123. The light source module 121 and the lens 123 are positioned at two ends of the optical module 122. Light rays emitted from the light module 121 penetrate the optical module 122 and are projected through the lens 123.

The light source module 121 is adjacent to the air outlet 1121 of the right sidewall 112. The light source 121 includes a red light emitting diode (LED) 1211, a blue LED 1212, and a green LED 1213, and a driving chip 1214. The driving chip 1214 is connected to the red LED 1211, the blue LED 1212, and the green LED 1213. The light source module 121 takes light rays emitted from the red LED 1211, the blue LED 1212, and the green LED 1213, and projects them to the optical module 122. In this embodiment, the red LED 1211 faces a corner of the right sidewall 112 and the rear sidewall 114, the blue LED 1212 faces the rear sidewall 114, and the green LED 1213 faces a corner of the left sidewall 111 and the front sidewall 113.

The optical module 122 is substantially V-shaped and includes a light inlet 1221 and a light outlet 1222. The light inlet 1221 and the light outlet 1222 both face the front sidewall 113. The light source module 121 is positioned on the light inlet 1221 of the optical module 122. The optical module 122 includes a digital micro device (DMD) 1223 and a number of optical elements (not shown). The DMD 1223 faces the through hole 1131 of the front sidewall 113, and is adjacent to the rear sidewall 114. The light rays projected onto the DMD 1223 are reflected by the DMD 1223 toward the front sidewall 113.

The lens 123 is received in the case 11, and is positioned on the light outlet 1222 of the optical module 122. The lens 123 is located in the through hole 1131. The light rays emitted from the DMD 1223 are projected to the lens 14. The light rays pass through the lens 14 and are projected onto a screen (not shown).

The circuit board 13 is positioned between the light source module 121 of the light engine 12 and the left sidewall 111, adjacent to the air inlet 1111 of the left sidewall 111. The circuit board 13 includes a first board 131 and a second board 132 perpendicular to the first board 131. The first board 131, being substantially perpendicular to the front sidewall 113 and the rear sidewall 114, extends between them. The second board 132 is substantially perpendicular to the left sidewall 111 and the right sidewall 112. The optical module 122 is positioned on the second board 132. The circuit board 13 is electrically connected to the driving chip 1214.

The heat sink assembly 14 includes a first heat sink 141, a second heat sink 142, and a third heat sink 143. The first heat sink 141 is attached on the red LED 1211, the second heat sink 142 is attached on the blue LED 1212, and the third heat sink 143 is attached on the green LED 1213. The first heat sink 141 is connected to the second heat sink 142. The second heat sink 142 and the third heat sink 143 face the air outlet 1121. Each of the first heat sink 141, the second heat sink 142, and the third heat sink 143 includes an attaching surface 1401 and a dissipating surface 1402 facing the attaching surface 1401. The attaching surface 1401 contacts the red LED 1211, the blue LED 1212, or the green LED 1213, and the heat generated by the red LED 1211, the blue LED 1212, or the green LED 1213 is conducted from the attaching surface 1401 to the dissipating surface 1402. In this embodiment, each of the first heat sink 141, the second heat sink 142, and the third heat sink 143 includes a heat pipe (not shown) embedded in the attaching surface 1401.

The fan assembly 16 is received in the case 11, and is positioned between the air inlet 1111 and the air outlet 1121. The fan assembly 16 includes at least one fan 161 positioned between the heat sink assembly 14 and the right sidewall 112. The air inlet 1111, the fan 161, and the air outlet 1121 form a dissipating passage 160. Cool air is sucked into the case 11 from the air inlet 111 by the fan 161, and heated air is blown out the case 11 via the air outlet 1121 by the fan 161. In this embodiment, the fan assembly 16 consists of two fans 161, one of the fans 161 is adjacent to the second heat sink 142, and the other fan 161 is adjacent to the third heat sink 143.

In use, the light source module 121, the DMD 1223, and the circuit board 13 are positioned on the dissipating passage 160. Heat generated by the light source module 121, and the DMD 1223, and the circuit board 13 is dissipated to the dissipating passage 160. The heated air is sucked from the air outlet 1121 and the cool air is drawn in from the air inlet 1111 under the movement of the fans 161. Therefore, the light source module 121, and the DMD 1223, and the circuit board 13 positioned in the dissipating passage 160 all have immediate and direct access to a heat dissipation path.

As the light source module 121, and the DMD 1223, and the circuit board 13 are positioned on one same dissipating passage 160, the combined heat is dissipated by a single fan assembly 16. The size and the cost of the projector 10 is decreased, and the noise generated by the projector 10 is reduced.

Particular embodiments are shown and are described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A projector, comprising:
   a case comprising a right sidewall, a left sidewall opposite to the right sidewall, a front sidewall and a rear sidewall, the left sidewall and the right sidewall respectively connected between the front sidewall and the rear sidewall, the right sidewall defining an air inlet, the left sidewall defining an air outlet aligned with the air inlet, and the front sidewall defining a through hole;
   a light engine received in the case and comprising a light source module, the light source module comprising a red light emitting diode (LED), a blue LED, and a green LED; the red LED facing a corner of the right sidewall and the rear sidewall, the blue LED facing the rear sidewall, and the green LED facing a corner of the left sidewall and the front sidewall;
   a circuit board positioned between the light source module and the left sidewall and adjacent to the air inlet;
   a heat sink assembly attached on the light source module and adjacent to the air outlet; and
   a fan assembly positioned between the heat sink assembly and the right sidewall, all of the air inlet, the fan assembly, and the air outlet forming a dissipating passage.

2. The projector of claim 1, wherein the light engine comprises an optical module and a lens, the optical module comprises a light inlet and a light outlet, the light source module is positioned on the light inlet, and the lens is positioned on the light inlet and penetrates the through hole.

3. The projector of claim 2, wherein the optical module comprises a digital micro device (DMD) facing the through hole of the front sidewall and adjacent to the rear sidewall.

4. The projector of claim 2, wherein the circuit board is electrically connected to the light source module, and the optical module is positioned on the circuit board.

5. The projector of claim 2, wherein the circuit board comprises a first board and a second board perpendicular to the first board, the first board is perpendicular to the front sidewall and the rear sidewall, the second board is perpendicular to the left sidewall and the right sidewall, and the optical module is positioned on the second board.

6. The projector of claim 1, wherein the heat sink assembly comprises a first heat sink, a second heat sink, and a third heat sink, the first heat sink is attached on the red LED, the second heat sink is attached on the blue LED, and the third heat sink is attached on the green LED.

7. The projector of claim 6, wherein the first heat sink is connected to the second heat sink, and the second heat sink and the third heat sink face the air outlet.

8. The projector of claim 7, wherein the fan assembly is positioned between the second heat sink, the third heat sink and the left sidewall.

* * * * *